(12) United States Patent
Lambert

(10) Patent No.: US 7,871,161 B2
(45) Date of Patent: Jan. 18, 2011

(54) SYSTEM FOR PAIRING SPECTACLE GLASSES WITHOUT STRAPPING

(76) Inventor: François Lambert, Les Rives de la Tour n°40, 2 rue du Vidourle, 30220 Aigues Mortes (FR)

( * ) Notice: Subject to any disclaimer, the term of this patent is extended or adjusted under 35 U.S.C. 154(b) by 275 days.

(21) Appl. No.: 11/658,513

(22) PCT Filed: Jul. 27, 2005

(86) PCT No.: PCT/FR2005/001954
§ 371 (c)(1),
(2), (4) Date: Apr. 6, 2009

(87) PCT Pub. No.: WO2006/018540
PCT Pub. Date: Feb. 23, 2006

(65) Prior Publication Data
US 2009/0201459 A1    Aug. 13, 2009

(51) Int. Cl.
*G02C 1/02*    (2006.01)
(52) U.S. Cl. ........................ 351/110; 351/124
(58) Field of Classification Search ........... 351/110, 351/103, 106, 111, 83, 86, 90, 91, 92, 124, 351/140, 41, 126
See application file for complete search history.

(56) References Cited

U.S. PATENT DOCUMENTS

| 4,102,566 A | 7/1978 | Shelton |
| 5,771,086 A | 6/1998 | Horikawa et al. |
| 5,847,800 A | 12/1998 | Tachibana et al. |
| 6,250,755 B1 | 6/2001 | Conner et al. |
| 6,896,367 B1 * | 5/2005 | Sohn .......................... 351/110 |
| 7,048,373 B2 * | 5/2006 | Yamaguchi et al. ......... 351/110 |

FOREIGN PATENT DOCUMENTS

| FR | 1051210 | 1/1954 |
| FR | 1193800 | 11/1959 |
| FR | 2803668 | 7/2001 |
| WO | WO 0196935 | 12/2001 |

OTHER PUBLICATIONS

French Search Report corresponding to French Patent Application No. 0408368 dated Jan. 13, 2005.
International Search Report corresponding to PCT Patent Application No. PCT/FR2005/001954 dated Dec. 2, 2005.

\* cited by examiner

*Primary Examiner*—Hung X Dang
(74) *Attorney, Agent, or Firm*—Marshall, Gerstein & Borun LLP

(57) ABSTRACT

The invention relates to the devoid of a strap spectacles comprising two spectacle glasses (1, 2) which are arranged above the nose and each of which is preferably provided with a notch (3) embodied where said two glasses are jointed, wherein said glasses are paired by a connection element (5) which comprises a tongue (7) forming a lug for assembling the glasses (1, 2), the connection element (5) for the glasses and a kit for producing the spectacles.

14 Claims, 2 Drawing Sheets

SYSTEM FOR PAIRING SPECTACLE GLASSES WITHOUT STRAPPING

FIELD OF INVENTION

This invention relates to a novel system for coupling rimless spectacle lenses for correcting visual deficiencies or protecting the eyes.

BACKROUND

Today, opticians more and more often offer spectacles of the type known as pierced-lens spectacles, the lenses of which are not rimmed by a frame but are linked by a bridge and held by screws.

FR-A-1 193 800 describes spectacles the lenses of which are linked without the use of screws using metal wires and comprising a central linking part serving as a bridge for the two lenses.

U.S. Pat. No. 5,771,086 for its part describes a type of spectacles comprising two independent lenses attached without a rim using a bridge constituted by a metal wire. The lenses include notching provided on the edge of the lens, on the nose side, as well as a pierced hole for passing a screw through.

Their appearance ensures that these items are a great commercial success. However, they have a certain number of drawbacks, and in particular:

The nasal visual field is not complete and is often limited in the upper part on the nose side.

The wearer is often irritated by the sight of the fixing screws in his field of sight on the nose side, the disturbance of which can be intolerable if the interpupillary distance of the patient is small (in this case, the wearer is often obliged to give up wearing this type of spectacles).

The shapes of spectacles are still limited to conventional shapes and can be poorly ergonomic.

Systems for coupling spectacle lenses are also known, as described in WO 01/96935 comprising a central linking element fitted at the front of the spectacles and equipped with pad arms which are inserted into notches provided on the side of the lenses above the nose. But the lenses tend to rotate relative to each other.

SUMMARY OF THE INVENTION

The device according to this invention eliminates these drawbacks and holds the lenses in a rigid manner, which prevents the lenses from rotating relative to each other while making mounting and removal easier. The pad arms are no longer integral with the front face and are independent and spaced apart from each other. They are placed on either side of the nose in an ergonomic position and no longer have their origin in the very centre, which was irritating and uncomfortable and meant that the spectacles were in a position where they were pushed far forward. The pad arms have the advantage of being able to be adjusted separately without the risk of stress or damage to the lenses as could be the case in a single-piece system. Similarly, they can be replaced independently. The surface in contact with the lenses is significant which gives the assembly a greater rigidity. Finally, the lenses can be of different thicknesses without running the risk of mounting or removal problems.

This is why the subject of this application is a pair of rimless spectacles comprising two spectacle lenses placed side by side above the nose and preferably each equipped with a recess provided at the junction of the two lenses, said lenses being coupled by a linking element, characterized in that the linking element between the two lenses comprises a tab constituting a lug (i.e. a part positioning another part) for assembling the lenses.

In this invention, by "pair of spectacles" is meant both the front part comprising the lenses, and the front part as well as its side arms.

The linking element is preferably, in its simplest form, a bar with a length which can range in particular from 6 mm to 20 mm for a width of 1 to 3 mm provided with a tab which is advantageously fitted in a median position. It can have a simple shape such as a lengthened parallelepiped or flattened elliptical bar or can have a more complex shape in order to add a decorative feature such as a star, a carriage, etc. provided with a tab. Its width will then be greater.

The average thickness of a bar is preferably comprised between 0.5 and 5 mm, excluding the height of the tab, in particular comprised between 0.5 and 4 mm, quite particularly comprised between 0.5 and 3 mm.

A single tab will for example have a length comprised between 2 and 8 mm, preferably comprised between 2 and 6 mm, in particular comprised between 2 and 4 mm, quite particularly comprised between 2 and 3 mm. The average thickness of the tab is for example comprised between 0.5 and 5 mm, in particular comprised between 0.5 and 4 mm, quite particularly comprised between 0.5 and 3 mm. Its shape is preferably parallelepiped.

A single tab is advantageously fitted in a median manner on the linking element and in particular on a bar.

The linking element is preferably provided with fixed rods which are threaded for fixing the lenses using a nut. The threaded rods of the linking element then pass through a hole provided on the side of the lenses above the nose. The linking element can simply comprise piercings for fixing the lenses by means of screws independent of the linking element.

The linking element is intended to link the two lenses placed side by side i.e. fitted edge-to-edge and advantageously to firmly hold the lenses, in particular in rotation relative to one another.

The tab of the linking element (or the tabs) is (are) arranged in order to cooperate with the recess preferably provided on the side of each of the lenses, by being inserted into said recess, the latter being preferably provided at the level where the lenses are fitted edge-to-edge.

Under preferable implementation conditions, the recess is precisely adapted to the width of the tab, thus preventing the lenses from swivelling.

Under other preferable conditions for implementation of the invention, the linking element comprises two tabs, i.e. a single broken tab.

Under yet other preferable conditions for implementation of the invention, the linking element also comprises two flattened strips each comprising on one side a tab with a length less than or equal to half of the length of the tab of the bar and with a length less than or equal to the length of the recess provided on the edge of the lens above the nose and also comprising a hole for the passage of a threaded rod as well as, preferably on the other side, a nose comfort pad arm rod.

The sum of the thicknesses of the tabs provided on the bar and on the strips is less than or equal to the thickness of the thinnest lens on the edge above the nose.

The tab on the strips is also arranged in order to cooperate with the recess preferably provided on the side of each of the lenses.

As a result of their original shape, the lenses can rest directly on the nose. However, under preferred conditions for implementation of the invention, the linking element comprises a nose support element comprising two comfort pad arm rods.

The strips can also be provided with fixed rods which are threaded for fixing the lenses using a nut. This solution is however generally the least aesthetically pleasing since the nuts would be located on the outside, given that the linking element, for example the bar, is usually fitted on the outside relative to the lenses and the strips on the side of the face.

Preferably, the linking element of the invention comprises a bar and strips with an approximately parallelepiped shape.

If the lenses can be fitted edge-to-edge along a line of any shape, under other preferred implementation conditions, the lenses are mounted edge-to-edge by a rectilinear section, preferably provided above the position of the nose.

A person skilled in the art understands that the tabs can also be replaced in particular by studs or nipples, or also screws and that in these cases, the lenses can comprise perforations instead of recesses. In this application the expressions "spectacle lenses each provided with a recess" and "linking element between the two lenses comprising a tab" also relate to spectacle lenses each provided with two perforations and linking elements comprising studs or nipples.

It should also be noted that the tab can be constituted by the bar itself. For this purpose it is possible to countersink preferably the front face of the lenses, over a part of the thickness of the lenses, in order to insert there the bar itself which therefore carries out a double function.

The pairs of spectacles which are the subject of this invention have very useful qualities.

The wearer of the spectacles according to the invention has vision close to reality which is more natural, having no field limit internally and is therefore more comfortable.

Moreover, the lenses can be independently replaced very easily, in the case of scratching or breakage or a change in vision over time.

Similarly, the frame can be changed at any time by its user, who can thus have several frames for a single set of lenses.

The device according to this invention holds the lenses in a rigid manner which prevents the lenses from rotating relative to each other while making mounting and removal easier.

The pad arms are not integral with the front face, are independent and spaced apart from each other. They can be fitted on either side of the nose in an ergonomic position. Similarly, they can be independently replaced. The surface in contact with the lenses is significant, which makes the assembly more rigid. It may also be noted that the lenses can be of different thicknesses without running the risk of mounting or removal problems.

The subject of this application is also a linking element for spectacle lenses comprising a tab constituting a lug (i.e. a part positioning another part) for assembling the lenses provided with recesses above the nose as well as two threaded rods or two pierced holes.

The linking element preferably also comprises two flattened strips each comprising a hole for the passage of a threaded rod or comprising a threaded rod, and on one side a tab with a length less than or equal to half of the length of the tab of the bar. The strips also advantageously include, preferably on the opposite side to their tab, a nose comfort pad arm rod.

The subject of this application is finally an assembly (kit) for producing spectacles comprising:
  a top linking element, and optionally its accessories (screws and nuts or simply nuts when the bar comprises threaded rods)
  a template for the machining of the lenses according to a shape allowing their mounting edge-to-edge.

The template is usually in the form of a physical support for a program for controlling the automatic machining of the lenses.

The preferred implementation conditions for pairs of spectacles described above also apply to the other subjects of the invention mentioned above and in particular to the linking elements described above.

BRIEF DESCRIPTION OF THE DRAWINGS

The invention will be better understood if reference is made to the attached drawings in which.

DETAILED DESCRIPTION

Figure 1:
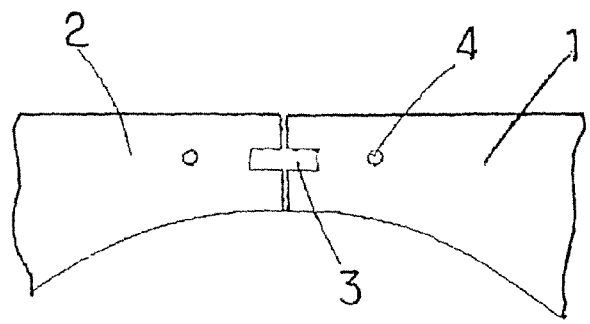
FIG. 1 represents the central part of two lenses placed side by side seen from the front.

FIG. 1 shows the right lens 1 and the left lens 2, represented only in part. These lenses are placed side by side each other above the nose, they are each provided with a recess 3 at the same height as well as a perforation 4 intended for passing the screws through. The perforations 4 are also at the same height. In this embodiment they are aligned with the recesses 3 in order to minimize the width of the linking element 5 represented below.

Figure 2:
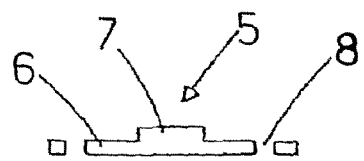
FIG. 2 is a lateral cross-section of a linking element constituted by a bar.

FIG. 2 shows a linking element 5 which is constituted by a bar 6 provided with a tab 7 as well as two perforations 8, intended to allow the optical screws to pass through. The tab 7 is fitted in a median manner on the bar 6.

Figure 3:
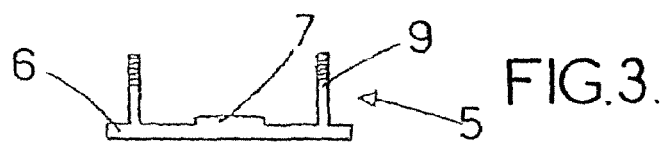
FIG. 3 is a lateral cross-section of a variant of the linking element of FIG. 2, in which the holes provided for the screws to pass through are replaced by screws integral with the bar.

FIG. 3 also shows a linking element 5 comprising a bar 6, as well as a tab 7, but the perforations 8 have been replaced by screws 9, in this case fixed and produced in one piece with the bar 6.

Figure 4:
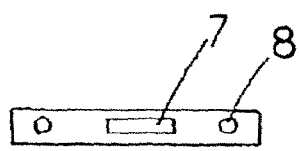
FIG. 4 is a top view of the element of FIG. 2 or of FIG. 3 seen from the side of the screws.

In FIG. 4 which is a top view, perpendicular to the preceding one, it is possible to observe the tab 7 which, in this version, does not occupy the whole of the width of the bar 6, as well as the alignment of the tab 7, and of the perforations 8.

Figure 5:
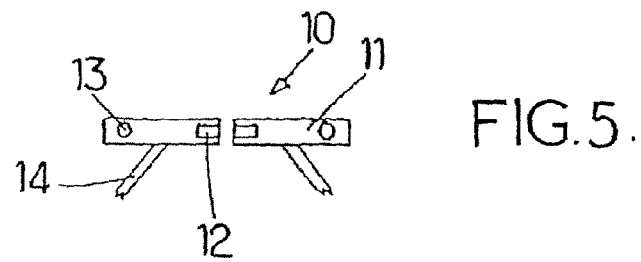
FIG. 5 is a top view of a pair of complimentary linking elements.

FIG. 5, which represents a pair of complementary linking elements 10, shows on each of these elements a strip 11, itself also provided with a tab 12, the length of which is approximately equal to half of the length of a tab 7 of a corresponding bar 6. The width of this tab 12 is identical to that of the other tab 7.

On the face opposite the face of the strip comprising the tab 12, a rod 14 (not represented in its entirety) is provided which is intended to support, at its end, a nose comfort pad.

Figure 6:
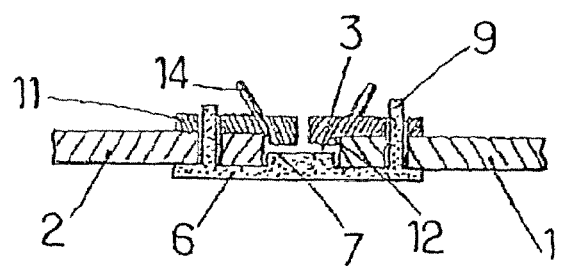
FIG. 6 is a cross-section produced in the plane of the screws of FIG. 3 of a pair of spectacles mounted using a linking element of this invention comprising a bar and two additional strips.

FIG. 6 represents a pair of lenses coupled by means of a linking system according to this invention, comprising a bar and two strips complementing the fixings. In this case a pair of lenses 1, 2 is shown. The holes provided in these lenses are passed through by screws 9 provided in one part on a bar of the type represented in FIG. 3.

The tab 7 with which this bar 6 is provided is introduced into the free space provided by the recesses 3 arranged in the lenses.

The lenses 1, 2 are sandwiched between this bar 6, and two complementary linking elements 10 each constituted by a strip 11 provided at its end, in the lengthwise direction, with a tab 12 the length of which is approximately equal to half of the length of the tab 7 with which the bar 6 is provided. The screws 9 pass through not only the perforations 4 provided in the lenses 1 and 2, but also those 8 provided in the strips, at the end opposite that carrying the tab 12. Screws, not represented here, fitted on the side of the strips 10, lock the assembly.

This cross-section finally shows the starts of the rods 14 provided in order to serve as a support for comfort pads. In order to understand the figure, the clearances between the different parts have been exaggerated. It is obvious to a person skilled in the art that these clearances must be reduced to the minimum on the one hand in order to allow mounting and on the other hand to give the assembly an excellent rigidity.

Figure 7:
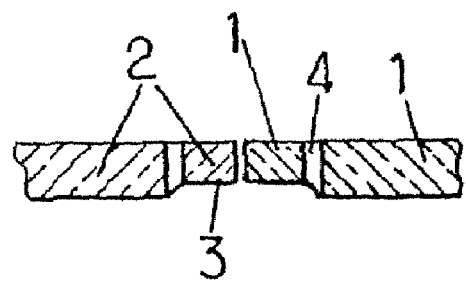
FIG. 7 represents, in cross-section, the central part of two lenses placed side by side seen from above.

FIG. 7 shows the same elements as FIG. 1, but the recess 3 completely passing through the lenses is replaced by a countersinking on only one part of the thickness of the lenses 1, 2. The bar can be fitted in this countersinking 3 and thus it plays a double role as bar and as tab.

Figure 8:
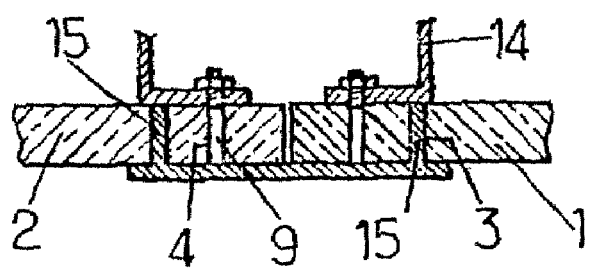
FIG. 8 is a variant of FIG. 6, where two studs replace the single tab.

In FIG. 8, the tabs 7 of FIG. 6 have been replaced by studs 15. Thus, the lenses 1, 2, comprise perforations 3 instead of recesses.

Figure 9:
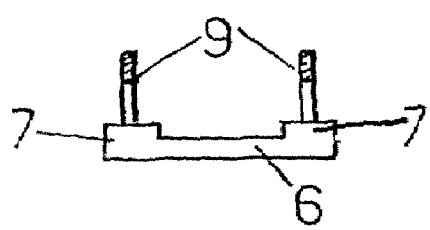
FIG. 9 is a lateral cross-section of a variant of the linking element of FIG. 3, in which there are two bars at the level of the screws, the holes provided for passing the screws through the lenses and the insertion of the bars are oblong.

In FIG. 9 it is observed that the tab is not single but double. The two half-tabs are situated at the ends of the linking element 5. According to the shape of these tabs 7 oblong or rectangular holes can be provided in the lenses of spectacles.

Figure 10:
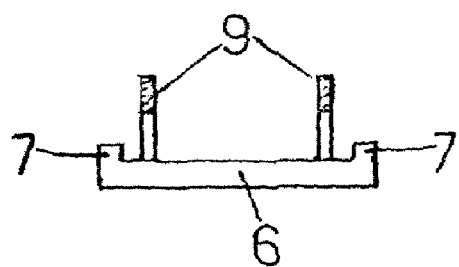
FIG. 10 is a variant of the linking element of FIG. 9 intended for lenses comprising a hole through which the screw passes and beside which a countersinking is produced for insertion of the bar.

Similarly, in FIG. 10, the tabs 7 are fitted on either side of the mounting screws 9. It is possible to provide for example rectangular countersinkings placed beside the holes provided in the spectacle lenses for the installation of the tabs.

Several of the above linking elements have been produced both in a straight version and in a curved version.

The invention claimed is:

1. A pair of rimless spectacles comprising two spectacle lenses placed side by side above the nose and fitted edge-to-edge, each spectacle lens comprising a recess in an edge adjacent to the other spectacle lens, said lenses being coupled by a linking element, the linking element comprising a tab constituting a lug for assembling the lenses, the tab being disposed in each recess of the spectacle lenses, and wherein the linking element comprises two flattened strips, each comprising on one side a tab with a length less than or equal to half of the length of the tab of the bar and with a length less than or equal to the length of the recess, the two flattened strips further comprisinq a hole for the passage of a threaded rod and a nose comfort pad arm rod.

2. A pair of spectacles according to claim 1, the linking element comprising a bar with a length of 6 mm to 20 mm for a width of 1 to 3 mm.

3. A pair of spectacles according to claim 1, the tab being located at a median position on the linking element.

4. A pair of spectacles according to claim 1, wherein the tab has a length between 2 and 8 mm.

5. A pair of spectacles according to claim 1, wherein the tab has an average thickness between 0.5 and 5 mm.

6. A pair of spectacles according to claim 1, wherein the linking element comprises one or more fixed rods which are threaded for fixing the lenses using a nut.

7. A pair of spectacles according to claim 1, wherein the recesses are adapted to the width of the tab, thus preventing swivelling of the lenses.

8. A pair of spectacles according to claim 1, wherein the two recesses together form an opening in the two spectacle lenses, the tab being substantially the same size and shape as the opening, and the tab being disposed in the opening.

9. A linking element for spectacle lenses, the linking element comprising a tab extending from one side of the linking element, the tab being substantially the same size and shape as an opening formed by two recesses in the spectacle lenses when the spectacle lenses are placed side by side and fitted edge-to-edge, the linking element further comprising one of two threaded rods and two pierced holes, and wherein the linking element comprises two flattened strips, each of the flattened strips comprising a hole for the passage of one threaded rod and on one side of the flattened strip a tab having a length less than or equal to half of the length of the tab of the linking element.

10. A linking element for spectacle lenses according to claim 9, wherein the flattened strips include a nose comfort pad arm rod.

11. An assembly kit for producing spectacles comprising:
a linking element according to claim 9 and a template for machining the lenses according to a shape allowing an edge-to-edge mounting.

12. An assembly kit according to claim 11, further comprising one of a screw and a nut.

13. A pair of spectacles comprising:
two spectacle lenses positioned immediately adjacent one another edge-to-edge along an edge of each spectacle lens, each spectacle lens including a recess in an edge that is immediately adjacent to the other spectacle lens and a perforation adapted to receive a screw, the two recesses together forming an opening; and
a linking element comprising:
a bar, the bar having a tongue extending from one side of the bar, the tongue being substantially the same size and shape as the opening formed by the two recesses, the tongue having a thickness that is less than a thickness of one of the spectacle lenses, the tongue being positioned within the opening formed by the two recesses, the bar being disposed at least partially along an outer surface of each of the spectacle lenses;
two flattened strips, each flattened strip comprising a tab and a hole, the tab extending from one side of the flattened strip, the tab being positioned at one end of the flattened strip, the tab having a thickness that is less than the thickness of one of the spectacle lenses and the tab having substantially the same size and shape as one of the recesses;
two screws extending from the same side of the bar as the tongue, each screw extending through the perforation in one of the spectacle lenses and through the hole in one of the flattened strips;
wherein the two spectacle lenses are sandwiched between the bar on one side and the two flattened strips on another side, the tongue extending into the opening, and each tab extending into a recess, the tongue and tabs being disposed adjacent one another and the tongue and tabs together filling the opening.

14. The pair of spectacles of claim 13, wherein each flattened strip further comprises a rod extending from a face opposite the tab, the rod being adapted to support a nose pad.

* * * * *